(12) United States Patent
Edmonds et al.

(10) Patent No.: US 9,749,789 B1
(45) Date of Patent: Aug. 29, 2017

(54) BALLISTICS SYSTEM FOR DETERMINING THE LOCATION OF A ROUND OF AMMUNITION

(71) Applicant: Digital Ballistics LLC, Elgin, SC (US)

(72) Inventors: Matthew Wade Edmonds, Fort Sam Houston, TX (US); Michael John Wilson, Alpharetta, GA (US)

(73) Assignee: Digital Ballistics LLC, Elgin, SC (US)

( * ) Notice: Subject to any disclaimer, the term of this patent is extended or adjusted under 35 U.S.C. 154(b) by 0 days.

(21) Appl. No.: 15/356,031

(22) Filed: Nov. 18, 2016

Related U.S. Application Data

(60) Provisional application No. 62/256,832, filed on Nov. 18, 2015.

(51) Int. Cl.
*H04W 24/00* (2009.01)
*H04W 4/02* (2009.01)
*F42B 12/38* (2006.01)
*F42B 5/26* (2006.01)

(52) U.S. Cl.
CPC .............. *H04W 4/02* (2013.01); *F42B 5/26* (2013.01); *F42B 12/382* (2013.01)

(58) Field of Classification Search
CPC ............ H04W 4/02; F42B 5/26; F42B 12/382
See application file for complete search history.

(56) References Cited

U.S. PATENT DOCUMENTS

| 2004/0099134 | A1* | 5/2004 | Gotfried | F41A 17/066 89/1.11 |
| 2004/0227001 | A1* | 11/2004 | Lightfoot | F41C 27/00 235/487 |
| 2009/0037374 | A1* | 2/2009 | Delia | F41A 17/063 |
| 2011/0153637 | A1* | 6/2011 | Bailey | F41A 17/06 707/769 |
| 2014/0378088 | A1* | 12/2014 | Goel | F41A 17/063 455/404.2 |
| 2015/0241153 | A1* | 8/2015 | Mardirossian | F41A 17/08 42/70.11 |
| 2016/0157032 | A1* | 6/2016 | Kane | H04R 3/00 381/56 |

* cited by examiner

*Primary Examiner* — Ajit Patel
(74) *Attorney, Agent, or Firm* — Jeffrey T. Stover; Haynsworth Sinkler Boyd, P.A.

(57) ABSTRACT

A system, associated with a round of ammunition, that enables a location of the round to be determined as a function of time, includes an antenna to receive a radio frequency (RF) signal, and output an electrical signal based on the RF signal. The system also includes a processor to execute instructions to receive the electrical signal from the antenna, and process the electrical signal to obtain network information that identifies a network address of a network device and a first time that the electrical signal was received. The system further includes a memory to store the network information to enable retrieval after the round is discharged from a firearm. The retrieval of the network information enables the network device to be identified based on the network address, and a proximate location of the round to be determined, at the first time, based on the location of the network device.

21 Claims, 7 Drawing Sheets

US 9,749,789 B1

BALLISTICS SYSTEM FOR DETERMINING THE LOCATION OF A ROUND OF AMMUNITION

BACKGROUND

Crimes that involve the discharge of a firearm (e.g., homicides, robberies, aggravated assaults, etc.) are often investigated by analyzing information associated with the ballistic characteristics of rounds that are discharged from the firearm (the "Ballistics Information"). The Ballistics Information identifies the caliber of the round, the type of round (e.g., hollow point, full metal jacket, soft point, round nose, etc.), a type of firearm (e.g., revolver, semi-automatic pistol, rifle, shot gun, etc.), unique markings on a discharged bullet associated with a specific gun (e.g., rifling grooves, barrel imperfections, etc.), impact deformation characteristics, etc. The Ballistics Information does not include location information that identifies the location of the round, firearm, or perpetrator prior to or after the discharge of the firearm. Such location information, if available, would be useful to investigators to solve crimes involving the use of a firearm.

SUMMARY

According to one implementation, described herein, a ballistics system, associated with a round of ammunition, may enable a location of the round of ammunition to be determined as a function of time. The ballistics system may include an antenna to receive radio a frequency (RF) signal from a network, and output an electrical signal based on the received RF signal. The ballistics system may also include a processing unit to execute one or more instructions to receive the electrical signal from the antenna, and process the electrical signal to obtain network information that identifies a network address of a network device, associated with the network, and a first time that the electrical signal was received. The ballistics system may further include a memory to store the network information to enable retrieval, from the memory, after the round of ammunition is discharged from a firearm. The retrieval of the network information may enable the network device to be identified based on the network address, and a proximate location of the round to be determined, at the first time, based on the location of the identified network device.

According to another implementation, described herein, a ballistics systems, associated with a round of ammunition, for determining the location of the round of ammunition as a function of time, may include a first antenna, associated with a bullet portion of the round of ammunition, to receive radio frequency (RF) signals. The ballistics system may also include a first processing unit, associated with a base of the bullet portion of the round of ammunition, to execute one or more first instructions to: receive electrical signals, from the first antenna, that are based on the received RF signals, and obtain, from the electrical signals, network information that identifies network addresses associated with a plurality of network devices in proximity of the round during a time period. The ballistics system may further include a first memory, associated with the bullet portion of the round of ammunition, to store the network information and information that identifies the times when the electrical signals were received by the first processing unit. The ballistics system may yet further include a battery, associated with a casing portion of the round of ammunition, to provide electrical power to the first processing unit or the first memory.

According to a further implementation, described herein, a method, may be performed by a ballistics device attached to or embedded within a round of ammunition, for collecting network information that enables location of the round to be determined as a function of time. The method may include receiving, by the ballistics device, radio frequency (RF) signals from one or more network devices during a time period; obtaining, by the ballistics device and from the RF signals, network information that identifies a first network address associated with a first time during the time period and a second network address associated with a second time during the time period. The method may also include storing the network information in a memory, associated with the ballistics device, to enable a computer device to: obtain the network information from the memory after the round of ammunition is expended from a firearm, determine a proximate location, of the round of ammunition, based on a location of a network device associated with the first network address or the second network address, and determine a time when the round of ammunition was at the proximate location based on the first time or the second time.

DETAILED DESCRIPTION

Figure 1:
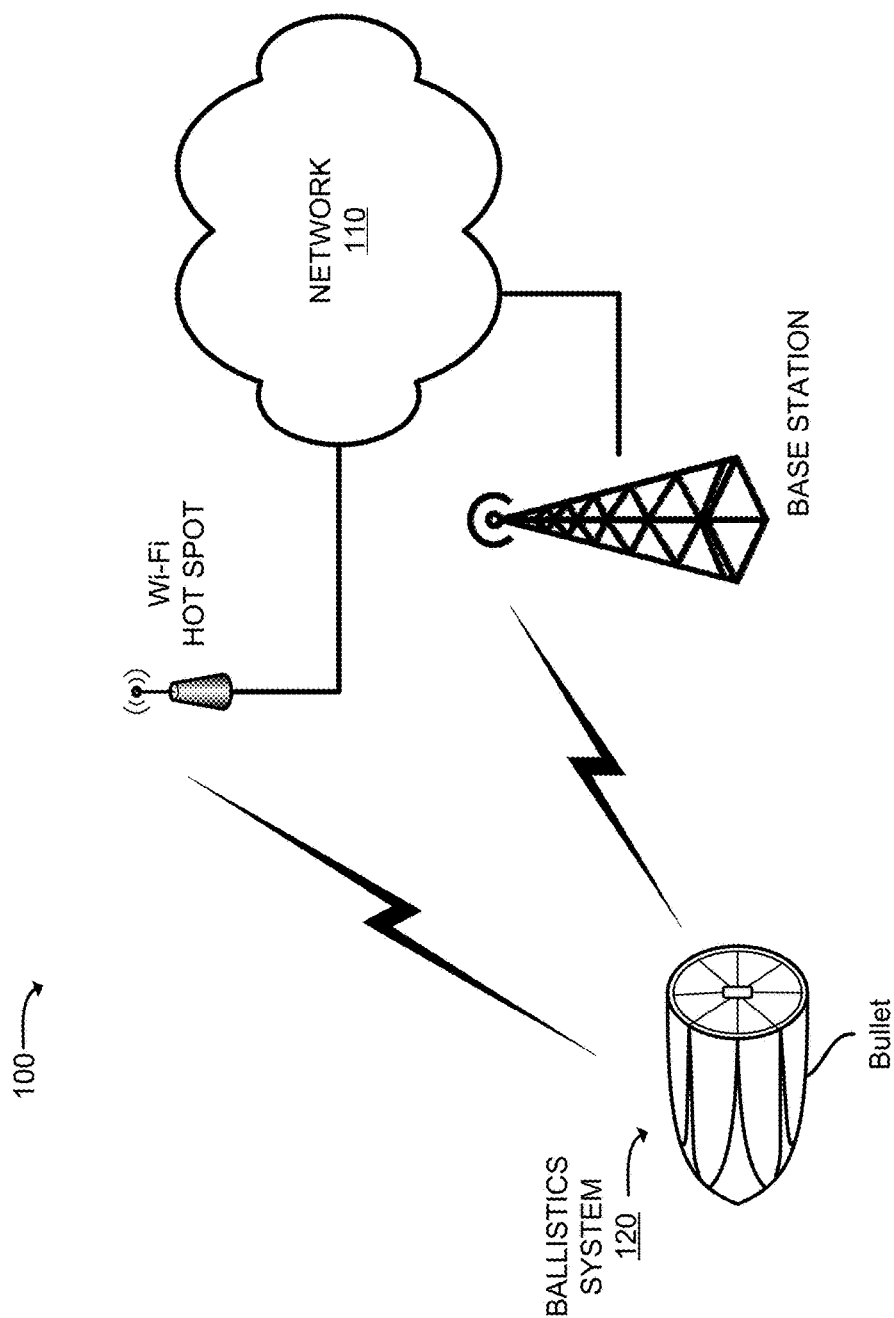
FIG. 1 is a diagram of an example environment in which systems and/or methods, described herein, may be implemented.

FIGS. 1-6 are attached hereto and incorporated herein by this reference. The following detailed description refers to the accompanying FIGS. 1-6. The same reference numbers in different figures may identify the same or similar elements.

The systems, methods, apparatuses, devices, technologies, and/or techniques (hereinafter referred to as the "systems and/or methods"), described herein, may enable the location, of a round of ammunition (e.g., including a bullet, powder charge (or "propellant"), casing, primer, etc.) and/or firearm from which the round has been or is to be discharged, to be identified, as a function of time, prior to and/or after such discharge. The systems and/or methods may include a ballistics system that is attached to, integrated with, and/or embedded within a round (e.g., within the bullet portion, casing portion, etc. of a round). The ballistics system may include a ballistics device, a power source, and/or an antenna that are connected by wired and/or wireless connections. The ballistics device may include a processor, a storage component (e.g., a memory, a computer-readable medium, a register, etc.), and/or a communication interface, some or all of which are interconnected by a wired and/or wireless connection. In a non-limiting implementation, the ballistics device may be associated with a radio frequency identification (RFID) component (e.g., tag, chip, antenna, etc.) and/or antenna that is capable of communicating with a network.

The systems and/or methods may enable the antenna to receive a signal over the air from a network component (e.g., a cell tower, a base station, an eNodeB, a Wi-Fi device, etc.) associated with a network (e.g., a cellular network, the Internet, a public and/or proprietary network, a home network, a wireless mobile network, etc.). The received signal may include one or more packets, datagrams, frames, segments, data chunks, and/or portions thereof (hereinafter collectively referred to as "packets" and individually, a "packet") that store a network address associated with a network device and/or a device from which the received signal was transmitted over the air (e.g., a cell tower, a base station, an eNodeB, a Wi-Fi device, etc.). The antenna may provide an electrical signal, based on the received signal, to the ballistics device via the communication interface for transmission to the processor. In one example, the communication interface may include a component (e.g., an amplifier circuit, coil, etc.) that amplifies and/or processes an electrical signal, received from the antenna, to condition the signal for processing by the processor. The processor may receive the electrical signal and may process the electrical signal to obtain the network address from a packet obtained from the signal (e.g., from the packet header, trailer, payload, etc.). The processor may also, or alternatively, obtain other information from the packet (hereafter, "packet information") such as information associated with a protocol used to transmit the packet (e.g., an Hypertext Transfer Protocol (HTTP), a Transfer Control Protocol (TCP), a User Datagram Protocol (UDP), etc.), a first time (e.g., hours, minutes, seconds, portions of a second, etc.) and/or a first date (e.g., day, month, year, etc.) when the packet was transmitted, a destination network address (e.g., Internet Protocol address, a media access control (MAC) address, etc.), a network address from which the packet originated, a port (e.g., a TCP port, etc.) via which the packet was transmitted, etc. Additionally, or alternatively, the processor may also, or alternatively, store in the data structure information that identifies a second time (e.g., hours, minutes, seconds, portions of a second, etc.) and/or a second date (e.g., day, month, year, etc.) at which the electrical signal was received and/or processed, and/or when the network address was obtained from the packet. The information identifying the network address, other packet information, and/or the second time and/or date is hereinafter collectively referred to as "network information."

A perpetrator may discharge a firearm causing a round to travel toward a target (e.g., a person, object, etc.) and/or become embedded within the target. The systems and/or methods may include a ballistics system that is installed, attached, and/or embedded within the bullet in a manner that enables a ballistics device, associated with the ballistics system, to survive, remain intact, and/or otherwise continue to function after the bullet strikes and/or becomes embedded within the target (note: proof of concept live fire tests support this). Such survival may enable the network information within the data structure to be read by the processor (e.g., after the discharged round is recovered from the target), from a memory associated with the device, and transmitted, via a communication interface associated with the device, to a server device via a wired connection and/or wireless connection. Additionally, or alternatively, the network information may be read from the memory and/or the processor by some other device separate from, in addition to, or in combination with the device.

In one example, the other device may be a computational and/or communication device, (e.g., a handheld device, a device capable of scanning an RFID tag, or some other computational and/or communication device) that can be used to interrogate the ballistics device (e.g., using a RF signal to communicate with the ballistics device) to determine a unique identifier associated with the round of ammunition (e.g., store by ballistics device and/or an RFID tag associated with the ballistics device and/or round) and/or to obtain the network information without removing the round from the target. The interrogation signal may enable the network information to be read from the memory and/or may include an instruction for the processor to read the network information from the memory and to provide the network information to the handheld device. Additionally, or alternatively, the device may interrogate the ballistics device to obtain, from the data structure, information associated with the round (e.g., the unique round identifier). The device may use a key (e.g., a copy of the key used to encode and/or encrypt the network information) and/or the information associated with the round to decode and/or decrypt (e.g., using a hash function, a cryptographic hash function, a checksum, etc. used to encode and/or encrypt the network information) the encoded and/or encrypted network information.

The systems and/or methods may enable the network information to be processed to create location information. For example, each network address, obtained from the network information, may be used to identify a respective network device with which each network address is associated. Additionally, or alternatively, a respective location of each network device can be determined based on the identification of each network device. The location of each network device may indicate that the round was within proximity of the location of each network device (e.g., 10 feet (ft.), 100 ft., 200 ft., 500 ft., 1000, ft., 5000 ft., etc.) at the time and/or date specified by the network information, which may enable the approximate location of the round to be identified and tracked as a function of date and time (hereinafter, "round location information").

The systems and/or methods, described herein, are described in the context of a ballistics application in which a round, with which a ballistics system is associated, is loaded within and/or discharged from a firearm, but need not be so limited. For example, in another implementation, the systems and/or methods may be associated with other applications associated with small packaging, high value goods, or other goods commonly the subject of a law enforcement, intelligence or some other investigation, such as, for example, tracking or identifying money, gems, military and/or intelligence equipment, etc.

FIG. 1 is a diagram of an example environment 100 in which the systems and/or methods, described herein, may be implemented. Environment 100 may include a ballistics system 120, associated with a round that is loaded within a firearm ((not shown in FIG. 1), a Wi-Fi Hot Spot, a base station and a network 110. Ballistics system 120, to be described in greater detail below) may include a computational and/or communication device that can communicate with network 110. In one non-limiting example implementation, ballistics system 120 may be associated with an RFID device and/or components or technology related thereto. Ballistics system 120 may receive a first signal from network 110 via the hot spot and may obtain, from the signal, first network information (described above). Ballistics system 120 may store the first network information in a memory associated with ballistics system 120. The first network information may identify a first network address associated with the hot spot and/or some other network device associated with network 110 and/or a first time and/or date at which the signal was transmitted from the hot spot, received by the ballistics device and/or stored in the memory.

Ballistics system 120 may also, or alternatively, receive a second signal from network 110 via the base station and may obtain, from the second signal, second network information (described above). Ballistics system 120 may store the second network information in the memory associated with ballistics system 120. The second network information may identify a second network address associated with the base station and/or some other network device associated with network 110 and/or a second time and/or date at which the second signal was transmitted from the base station, received by ballistics system 120 and/or stored in the memory.

After the round is discharged from the firearm, ballistics system 120 may output the first network information and/or the second network information to an external device (e.g., a server device, a tablet computer, smartphone, a device capable of communicating with an RFID device, etc.). Additionally, or alternatively, the external device may read the first and/or second network information from a memory associated with the ballistics system 120. Additionally, or alternatively, all or a portion of ballistics system 120 (e.g., including at least the memory) may be removed from the fired round and a processor may be connected to the memory to obtain the first and/or second network information.

The external device may process the first and/or second network information to create round location information. In one example, the external device may perform a lookup operation by accessing a data structure that stores a list of network addresses associated with each network device and information that identifies a respective different location for each network device. The lookup operation may identify a first proximate location associated with the first network address and a second proximate location associated with the second network address. Based on the lookup operation, the server device may create round location information. The round location information may be based on the network information that identifies the first proximate location, associated with the hot spot, at the first time and/or date and/or a second proximate location, associated with the base station, at the second time and/or date. The round location information may be used to identify the relative proximate location of the firearm, and/or the round during a time period from the first time and/or date to the second time and/or date.

Figure 2:
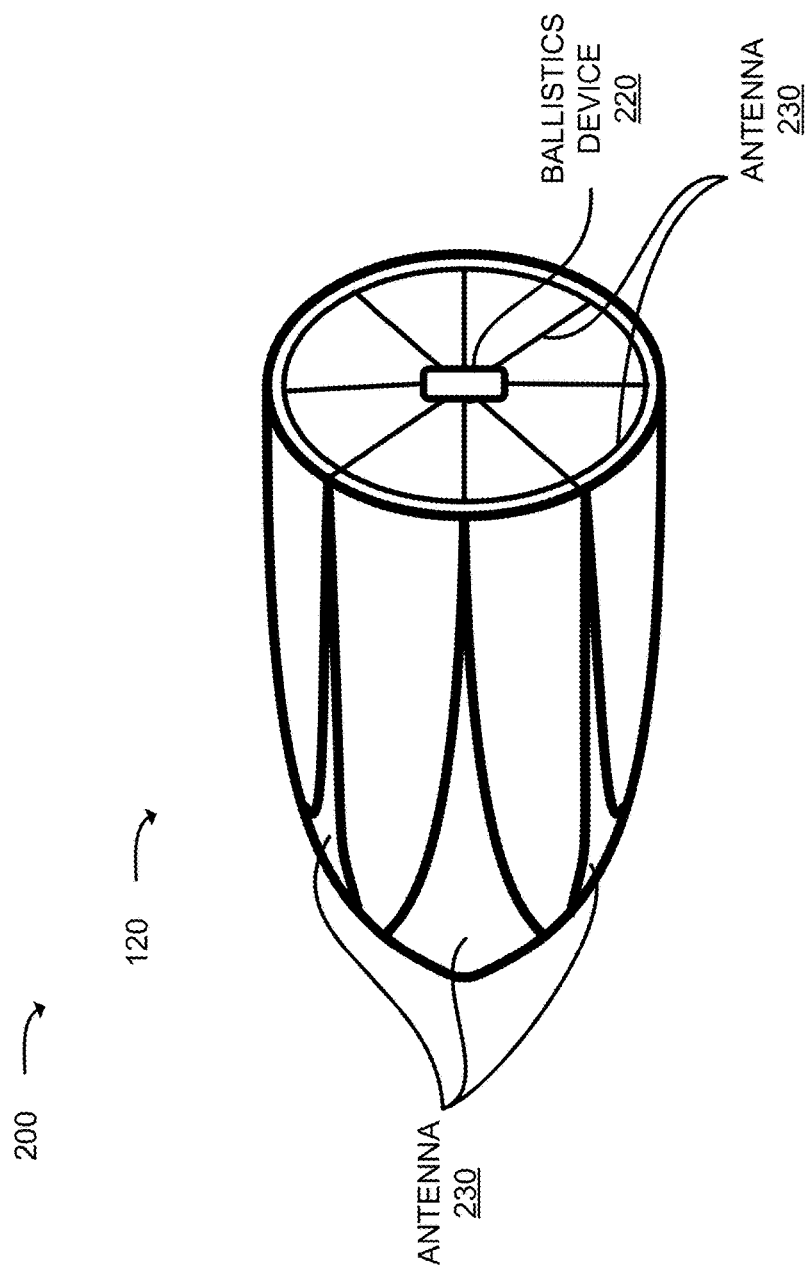
FIG. 2 is a diagram of an example bullet associated with a ballistics system of FIG. 1.

FIG. 2 is a diagram of an example bullet 200 associated with ballistics system 120. As illustrated in FIG. 2, ballistics system 120 may include a collection of components including a ballistics device 220 and one or more antenna elements 230 (shown as "antenna 230"). For example, ballistics device 220 may be attached to and/or embedded in bullet 200. In one non-limiting example, ballistics device 220 may be attached to and/or embedded within a first end of bullet 200 (hereinafter "bullet base") that is opposite a second end of the bullet (hereinafter "bullet point").

Antenna 230 may be attached to, connected, and/or installed on a surface (or any portion thereof) of bullet 200, casing, and/or firearm to receive RF signals received from various network devices such as Wi-Fi hot spots, base stations, eNodeBs, etc. In one non-limiting example, the surface of bullet 200 may include a dialectric material and/or an insulator that precludes antenna 230 from being electrically and/or RF grounded to bullet 200, which may enable antenna 230 to receive the RF signals and to provide an electrical signal, based on the received RF signal, to ballistics device 220. Additionally, or alternatively, antenna 230 may include a dielectric or insulator material to prevent antenna 230 from becoming electrically or RF grounded to bullet 230. The dielectric material may be associated with a low dielectric constant (e.g., a dielectric constant less than a threshold) that enables an RF signal to propagate through the dielectric material with low loss (e.g., less than 1, 2, 3, etc. decibels) to be received by antenna 230.

Additionally, or alternatively, when bullet 200 is a full metal jacket (FMJ) bullet type, antenna 230 may be attached to and/or integrated on the nose of the FMJ of bullet 200. Additionally, or alternatively, antenna 230 may be similarly attached to the nose portion (or any portion thereof) of other types of bullet 200 (e.g., hollow point, soft point, round nose, etc.). Additionally, or alternatively, antenna 230 may be attached to and/or integrated within the circular base of the casing (or any portion thereof) (to be described in greater detail below with respect to FIG. 5) and be electrically connected to a processor and/or communication interface associated with ballistics system 120.

Antenna 230 may correspond to a monopole, dipole, flared notch, spiral, patch, micro-strip, and/or other type of antenna with dimensions comparable to and/or supported by bullet 200, casing or round. Additionally, and/or alternatively, antenna 230 may correspond to a micro-strip, nano-strip, or some other type of antenna that can adhere to, conform to, and/or be embedded within bullet 200, the casing, the round and/or a firearm in which the round is loaded. Antenna 230 may also, or alternatively, include or correspond to an RFID device or tag that stores a unique identifier that can uniquely identify a round of ammunition. The unique identifier may be obtained when an external device scans (e.g., using a laptop computer, tablet computer, smartphone, or any device capable of scanning the RFID tag to obtain the unique identifier) the round or expended bullet in which the RFID tag is embedded and/or attached.

The attachment and/or embedment of ballistics device 220 on the base of bullet 200 and/or casing (casing not shown in FIG. 2) may preclude ballistics device 220 from being destroyed and/or rendered inoperable when the round is discharged from the firearm and/or impacts a target. The attachment to and/or embedment of ballistics device 220 on the base of bullet 200 and/or casing may enable ballistics device 220 to survive the impact of bullet 200 when bullet 200 strikes and/or enters the target and is subject to extreme deceleration and forces that are sufficient to cause significant deformation and destruction of bullet 200 during impact and entry. Tests performed on a bullet demonstrate the survivability of an object that is attached to and/or embedded within bullet 200 base. Such tests indicate that ballistics device 220 would remain intact and/or survive after discharge from the firearm and/or impact with a target.

By way of example, antenna 230 may receive a signal over the air from a network component (e.g., a cell tower, a base station, an eNodeB, a Wi-Fi hot spot device, etc.) associated with network 110 (e.g., a cellular network, the Internet, a public and/or proprietary network, a home network, a wireless mobile network, etc.). The received signal may include one or more packets, datagrams, frames, segments, data chunks, and/or portions thereof (hereinafter collectively referred to as "packets" and individually, a "packet") that store a network address associated with a network device and/or a device from which the received signal was transmitted over the air (e.g., a cell tower, a base station, an eNodeB, a Wi-Fi device, etc.). Antenna 230 may provide an electrical signal, based on the received signal, to ballistics device 220 (via the communication interface associated with ballistics device 220) for transmission to and processing by the processor associated with ballistics device 220. In one example, the communication interface may include a component (e.g., an amplifier circuit, coil, etc.) that amplifies and/or processes an electrical signal, received from the antenna, to condition the signal for processing by the processor. The processor may receive the electrical signal and may process the electrical signal to obtain the network address from a packet obtained from the signal (e.g., from the packet header, trailer, payload, etc.). The processor may also, or alternatively, obtain other information from the packet (hereafter, "packet information") such as information associated with a protocol used to transmit the packet (e.g., an Hypertext Transfer Protocol (HTTP), a Transfer Control Protocol (TCP), a User Datagram Protocol (UDP), etc.), a first time (e.g., hours, minutes, seconds, portions of a second, etc.) and/or a first date (e.g., day, month, year, etc.) when the packet was transmitted, a destination network address (e.g., Internet Protocol address, a media access control (MAC) address, etc.), a network address from which the packet originated, a port (e.g., a TCP port, etc.) via which the packet was transmitted, etc. Additionally, or alternatively, the processor may also, or alternatively, obtain information that identifies a second time (e.g., hours, minutes, seconds, portions of a second, etc.) and/or a second date (e.g., day, month, year, etc.) at which the electrical signal was received and/or processed, and/or when the network address was obtained from the packet. The information identifying the network address, other packet information, and/or the second time and/or date is hereinafter collectively referred to as "network information."

Ballistics device 220 may store information, identifying the network address, in a data structure within a memory associated with ballistics device 220. Additionally, or alternatively, ballistics device 220 may store information identifying the first time and/or date, and/or the second time and/or date in the data structure. Ballistics device 220 may also, or alternatively, store in the data structure all or a portion of the network information.

In a non-limiting example, the data structure may include a collection of fields including a round field, a date field, a time field, a network address field, a network information field, etc. For example, round field may store a unique round identifier (e.g., shown as "x09z1000000001" in Table 1 below) associated with the round. Date and time fields may store information that identifies one or more dates (e.g., days months, years, etc.; shown as "090924") and/or times (e.g., hours, minutes, seconds, or fractions thereof; shown as "23:11:53:01, 23:11:53:01, . . . "). Network address field may store information that identifies one or more network addresses (e.g., IP address, MAC address, etc.) obtain from packets received and/or processed one the dates and times identified in the corresponding date and time fields. Network information field may store network information that identifies one or more communication, network or Internet protocols (e.g., TCP, HTTP, IPv6, etc.) and/or ports (e.g., shown as TCP, Port 0001, etc. in Table 1) obtained from packets received and/or processed one the dates and times identified in the corresponding date and time fields. Ballistics device 220 may store, in the data structure of Table 1, other entries that identify other network addresses, dates, times, other network information, etc. obtained from different packets as a function of time as shown in the data structure below.

| Round Identifier: x09z1000000001 | | | |
|---|---|---|---|
| Date | Time | Network Address | Network Information |
| Sep. 9, 2014 | 23:11:53:01 | 192.66.82.11 | TCP, Port 001 |
| Sep. 9, 2014 | 23:11:54:21 | 192.66.82.11 | TCP, Port 001 |
| Sep. 9, 2014 | 23:11:55:41 | 192.168.1.14 | TCP, Port 007 |
| Sep. 9, 2014 | 23:11:56:61 | 192.168.1.14 | TCP, Port 007 |

The data structure of Table 1 above includes a number of fields for explanatory purposes only, but need not be so limited. Additionally, or alternatively, the data structure may include additional fields, fewer fields, different fields, or differently arranged fields than are described above.

Additionally, or alternatively, ballistics device 220 (e.g., using the processor) may encode all or portion of the network information (e.g., using a hash function, a cryptographic hash function, a checksum, etc.) to create encoded and/or encrypted network information. Ballistics device 220 may use a unique key (e.g., one or more alphanumeric characters or symbols, a string, etc.) and/or the information associated with the particular round (e.g., a round identifier, etc.) to encode and/or encrypt the network information and may store the encoded and/or encrypted network information in the data structure. In this manner, the encoded and/or encrypted network information may preclude tampering by an unauthorized interrogation and/or device (e.g., that does not use or have access to the key) and/or may ensure that the network information is inextricably associated with the round to preserve the chain of evidence (e.g., linking the network information to the round).

By way of example, a perpetrator may discharge a firearm causing a round to travel toward a target (e.g., a person, object, etc.) and/or become embedded within the target. Ballistics device 220 may be installed, attached, and/or embedded within bullet 200 in a manner that enables ballistics device 220 to survive, remain intact, and/or otherwise continue to function after the round strikes and/or becomes embedded within the target (note: proof of concept live fire tests support this). Such survival may enable the network information within the data structure to be read by the processor (e.g., after the discharged round is recovered from the target), from a memory associated with ballistics device 220, and transmitted, via a communication interface associated with ballistics device 220, to a server device associated with network 110 via a wired connection and/or wireless connection. Additionally, or alternatively, the network information may be read from the memory and/or the processor by a user, by some other device (e.g., a tablet computer, a smart phone, a handheld RFID scanning device, etc.) separate from, in addition to, or in combination with ballistics device 220.

In one example, the handheld, external device may be a computational and/or communication device, (e.g., a handheld device, a RFID scanning device, or some other computational and/or communication device) that can be used to interrogate ballistics device 220 (e.g., using a RF signal to communicate with the ballistics device) to cause ballistics device 220 to obtain the network information from a memory (from the data structure (Table 1)) associated with ballistics device 220, without removing the round from the target. The interrogation signal may enable the network information to be read directly from the memory and/or may include an instruction for the processor to read the network information from the memory and to provide the network information to the handheld device. Additionally, or alternatively, the device may interrogate the ballistics device to obtain, from the data structure, information associated with the round (e.g., the unique round identifier). The device may use a key (e.g., a copy of the key used to encode and/or encrypt the network information) and/or the information associated with the round to decode and/or decrypt (e.g., using a hash function, a cryptographic hash function, a checksum, etc. used to encode and/or encrypt the network information) the encoded and/or encrypted network information.

The systems and/or methods may enable the network information to be processed to create round location information. For example, each network address, obtained from the network information, may be used to identify a respective network device with which each network address is associated. Additionally, or alternatively, a respective location of each network device can be determined based on the identification of each network device. The location of each network device may indicate that the round was within proximity of the location of each network device (e.g., 10 feet (ft.), 100 ft., 200 ft., 500 ft., 1000, ft., 5000 ft., etc.) at the time and/or date specified by the network information, which may enable the approximate location of the round to be identified and tracked as a function of date and time (hereinafter, "round location information").

The systems and/or methods, described herein, are described in the context of a ballistics application in which a round, with which a ballistics device is associated, is loaded within and/or discharged from a firearm, but need not be so limited. For example, in another implementation, the systems and/or methods may be associated with other applications associated with small packaging, high value goods, or other goods commonly the subject of a law enforcement, intelligence or some other investigation, such as, for example, tracking or identifying money, gems, military and/or intelligence equipment, etc.

Figure 3:
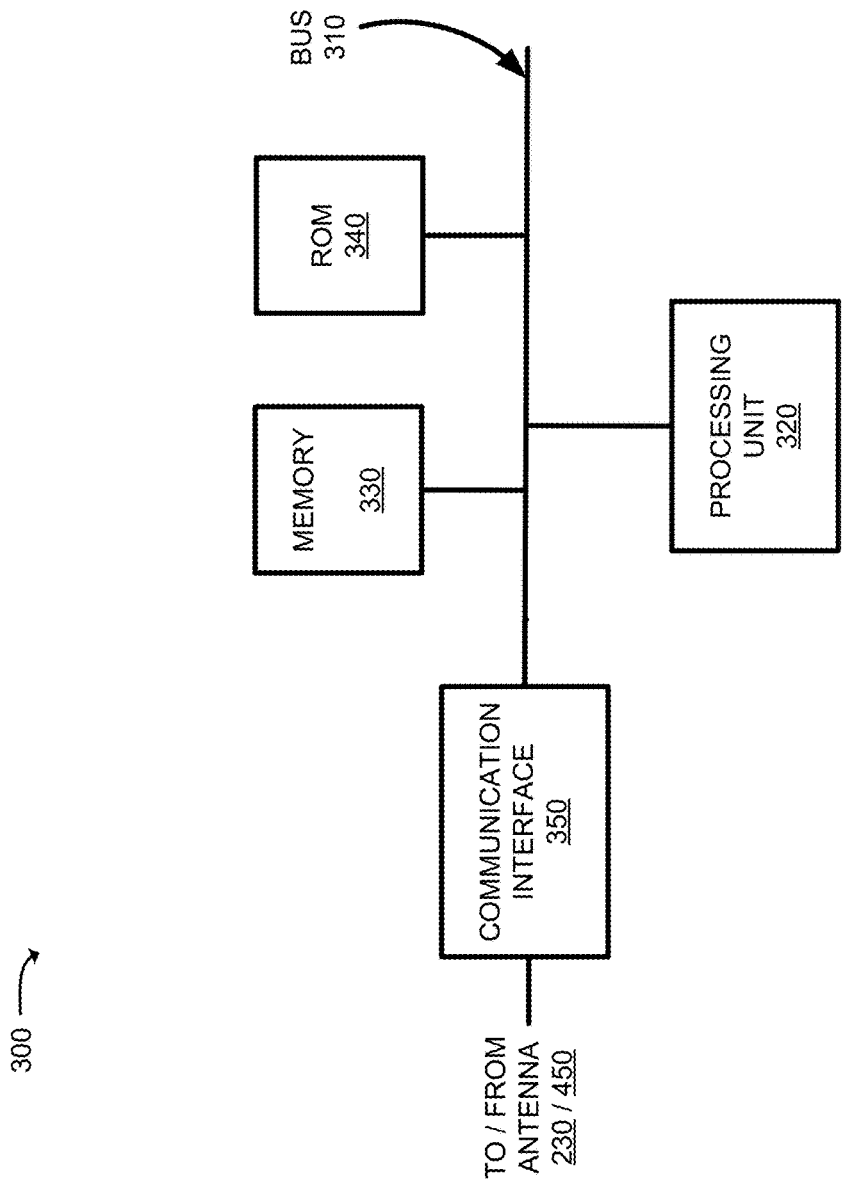
FIG. 3 is a diagram of one or more components of a ballistics device associated with the ballistics system of FIG. 2.

FIG. 3 is a diagram of one or more components of ballistics device 300. Ballistics device 300 may correspond to ballistics device 220 of FIG. 2 and/or ballistics device 500 of FIG. 5. Additionally, or alternatively, ballistics device 220 of FIG. 2 and/or ballistics device 500 of FIG. 5 may include one or more devices 300. Ballistics device 300 may include a collection of components, such as a bus 310, a processing unit 320, a memory 330, a read-only memory (ROM) 340, and/or a communication interface 350. Bus 310 may include a path that permits communication among the components of ballistics device 300.

Processing unit 320 may include a processor, multiple processors, microprocessors, or other types of processing logic that may interpret, execute, and/or otherwise process information contained in, for example, memory 330. The information may include computer-executable instructions and/or data that may implement one or more embodiments of the systems and/or methods. Processing unit 320 may comprise a variety of hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. Processing unit 320 may comprise a single core or multiple cores. Moreover, processing unit 320 may comprise a system-on-chip (SoC) or system-in-package (SiP).

Memory 330 may include a random access memory (RAM) or another type of dynamic storage device that may store information and instructions for execution by processing unit 320. ROM 340 may include a ROM device or another type of static storage device that may store static information and/or instructions for use by processing unit 320. In some implementations, memory 330 may also be implemented as solid state memory, such as flash-based memory.

Communication interface 350 may include any transceiver-like mechanism that enables device 300 to communicate with the antenna and/or a server device to which network information is outputted. In one example, the ballistics device may include a component (e.g., an amplifier circuit, coil, etc.) that amplifies and/or processes an electrical signal, received from antenna 230 of FIG. 2 and/or, to condition the signal for processing unit 320.

Device 300 may perform certain operations in response to processing unit 320 executing software instructions contained in a computer-readable medium, such as memory 330. For instance, device 300 may implement an application by executing software instructions from memory 330. A computer-readable medium may be defined as a non-transitory memory device, where the memory device may include a number of physically, possibly distributed, memory devices. The software instructions may be read into memory 330 from another computer-readable medium, or from another device via communication interface 350. The software instructions contained in memory 330 may cause processing unit 320 to perform processes that will be described later. Alternatively, hardwired circuitry may be used in place of or in combination with software instructions to implement processes described herein. Thus, implementations described herein are not limited to any specific combination of hardware circuitry and software.

The number of components of device 300 in FIG. 3 is provided for explanatory purposes. Additionally, or alternatively, there may be additional components, fewer components, different components and/or differently arranged components than described in FIG. 3. For example, device 300 may include a power supply (e.g., battery, an alternating current source, a direct current power source, etc.) (not shown in FIG. 3) connected to one or more of the components of device 300.

Figure 4A:
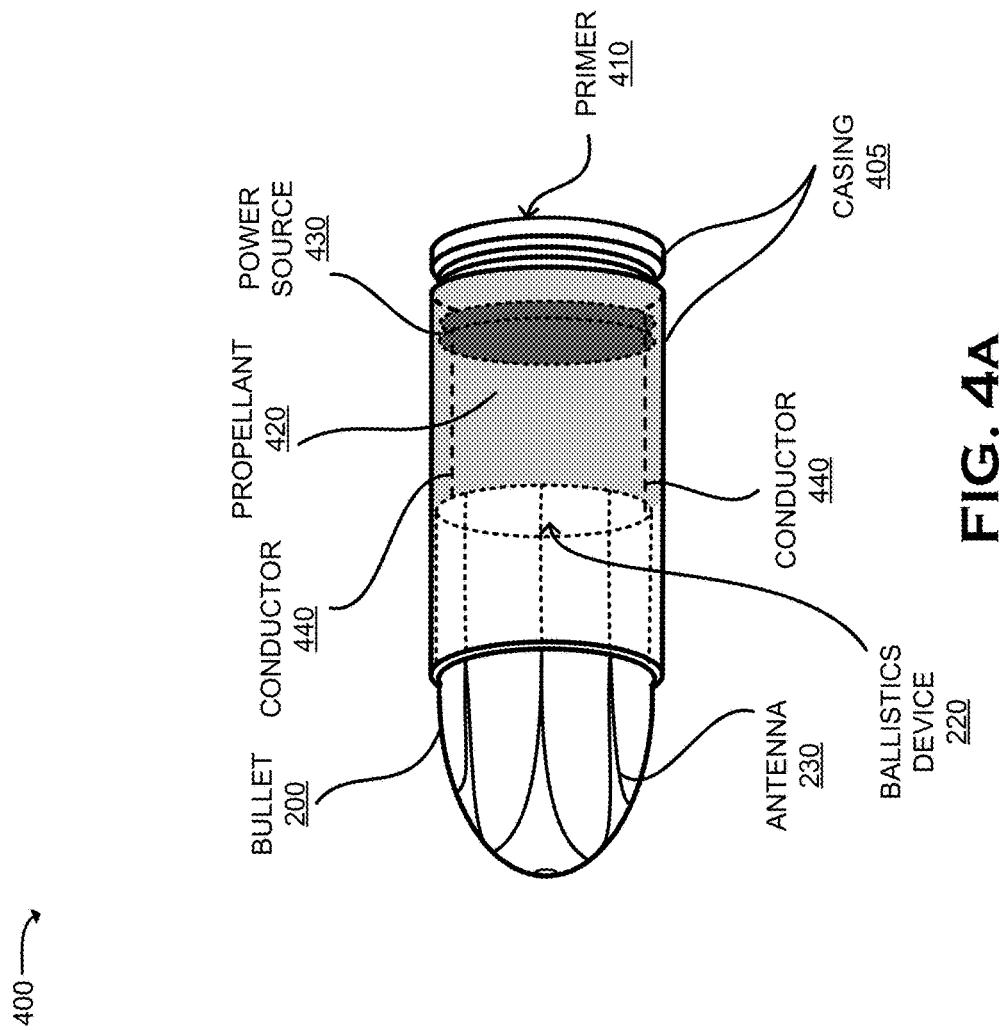
FIGS. 4A and 4B are diagrams of an example round of ammunition associated with a ballistics system.
Figure 4B:
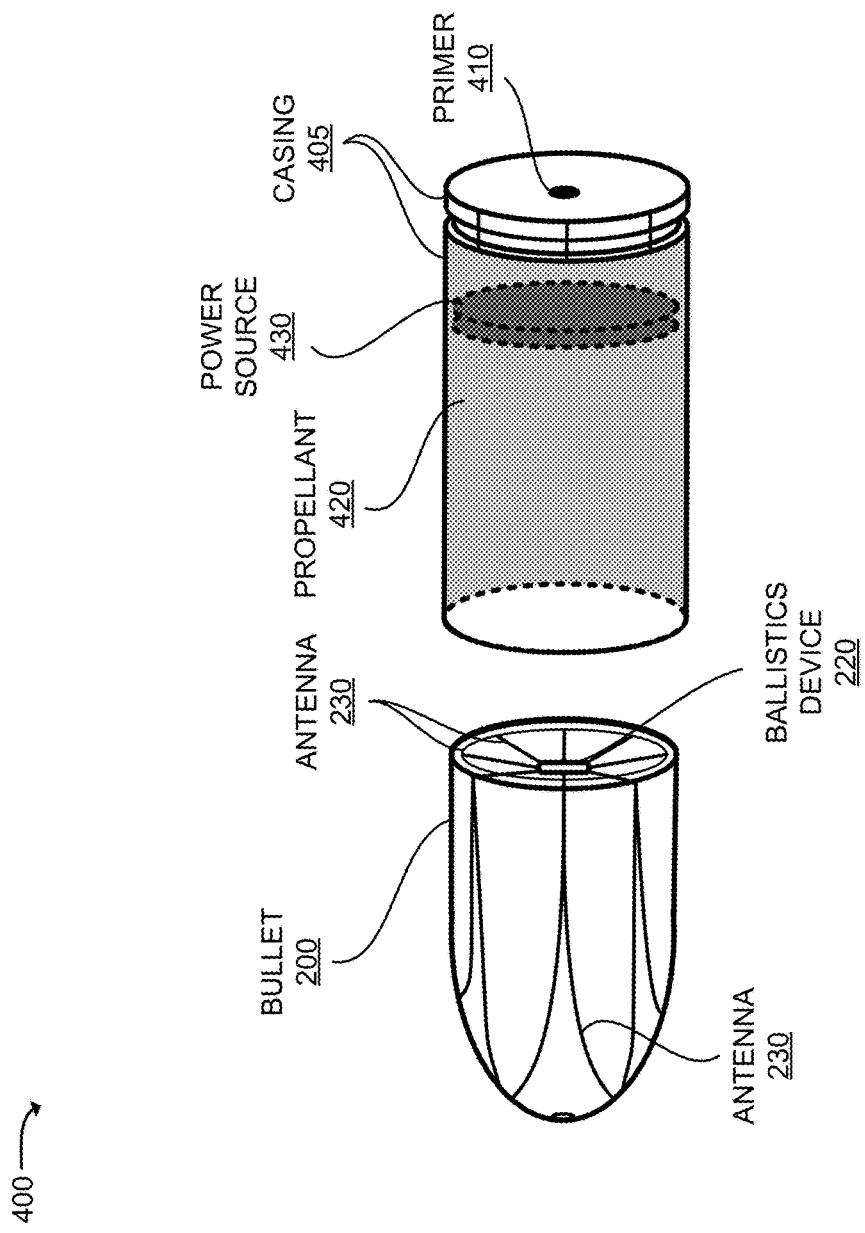

FIGS. 4A and 4B are diagrams of an example round 400 that may include ballistics system 120. As illustrated in FIG. 4A, round 400 may include bullet 200 and casing 405. Casing 405 may include a primer 410 and a propellant 420. Primer 410, when struck (e.g., by a firing pin of a firearm, etc.) may cause propellant 420 (e.g., gun powder, cordite, etc.) to burn and/or ignite and/or bullet 200 to be fired and separate from casing 405 as shown in FIG. 4B. Ballistics system 120 may include some or all of the components described above with respect to FIGS. 2 and 3 (e.g., ballistics device 220 and/or antenna 230) as well as a power source 430 and one or more conductors 440. Power source 430 may correspond to a source of alternating current or direct current electrical power, microelectromechanical systems (MEMs), etc. In one non-limiting example, power source 430 may correspond to a battery of any shape or size that can be attached to, connected to, or embedded within casing 405, including, for example, a watch battery, button cell, and/or the like that can fit within or be attached to casing 405. Power source 430 may also, or alternatively, be connected to an external power source such as that associated with a firearm, clip, etc. such as, for example, a solar panel that conforms to a surface of the firearm, a battery installed or attached to the firearm or clip, etc. Power source 430 may be connected to ballistics device 220 by one or more conductors 440 to power ballistics device 220 prior to round 400 being discharged from a firearm and bullet 200 being separated from casing 405.

Figure 5:
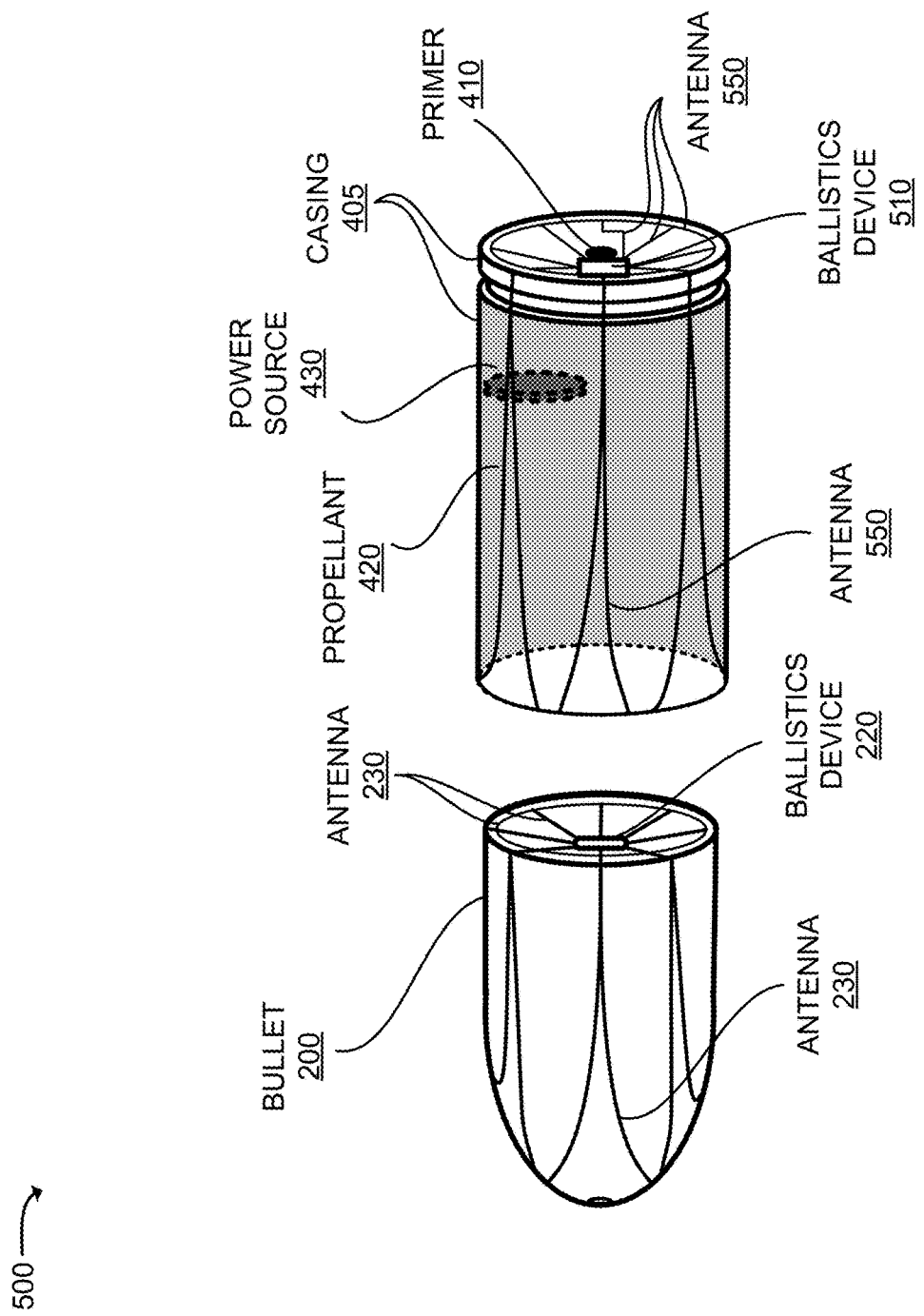
FIG. 5 is a diagram of an example round that may include a ballistics system associated with a casing portion of the round.

FIG. 5 is a diagram of an example round 500 that may include a ballistics device 510 associated with casing 405. As illustrated in FIG. 5, round 500 may include bullet 200 and casing 405. Bullet 200 may include a first ballistics device 220 and a first antenna 230 in a manner similar to that described above with respect to FIG. 2. Casing 405 may include a second ballistics device 510 and a second antenna 550 that are associated with (e.g., attached, connected to, or embedded within) an exterior surface and/or cylindrical wall portion of casing 405 and/or a circular base of casing 405. When second ballistics device 510 is located on the circular base of casing 405, second ballistics device 510 may not cover primer 410 and/or be located where second ballistics device 510 can be damaged by the striking pin or some other firing mechanism of the firearm.

Second ballistics device 510 may be attached to, connected to and/or embedded within the circular base of casing 405. In one non-limiting example, second ballistics device 510 may be attached to and/or embedded within a first end of casing 405 (hereinafter "casing base") that is opposite a second, open end of casing 405 (hereinafter "open end") in which bullet 200 is inserted. Antenna 550 may be installed on the surface of casing 405 to receive RF signals that include network information received from various types of network devices such as Wi-Fi hot spots, base stations, eNodeBs, server devices, etc. In one non-limiting example, the surface of the casing 405 may include a dielectric material and/or insulator that preclude antenna 550 from being electrically or RF grounded to casing 405, which may enable second antenna 550 to receive the RF signals and to provide an electrical signal, based on the received RF signal, to second ballistics device 510. In other implementations, the location of antenna 550 need not be so limited. For example, antenna 230 and/or 550 may be embedded or attached to any portion of bullet 200 or casing 405.

Round 500 may include power source 430 that is connected to first ballistics device 220 and/or second ballistics device 510 via one or more conductors (not shown in FIG. 5) in a manner similar to that described above with respect to FIGS. 4A and 4B. FIG. 5 shown both ballistics device 220 and 550, but need not be so limited. For example, round 500 may include only ballistics device 220 without ballistics device 550 as shown in FIGS. 4A and 4B. Additionally, or alternatively, round 500 may include ballistics device 550 without ballistics device 220; however, in this case, bullet 200 may include a memory (e.g., memory 330, etc.) that stores network information received, via a conductor (e.g., conductor 440, etc.), from ballistics device 550. The memory may be attached to, connected to, or embedded within bullet 200 (e.g., a base portion or some other portion of bullet 200).

One or both of first ballistics device 220 and/or second ballistics device 510 may obtain network information. In one example, second ballistics device 510 may obtain and/or store network information after bullet 200 is discharged from the firearm and is separated from casing 405. In this example, the network information may be obtained, by an external device (e.g., a laptop computer, a tablet computer, a smartphone, a device capable of scanning an RFID tag associated with ballistics device 510, etc.), and processed, in a manner similar to that described above with respect to FIG. 1, to identify a location of the round 500 and/or the firearm in which round 500 is loaded before and/or after the discharge of the round from the firearm.

Figure 6:
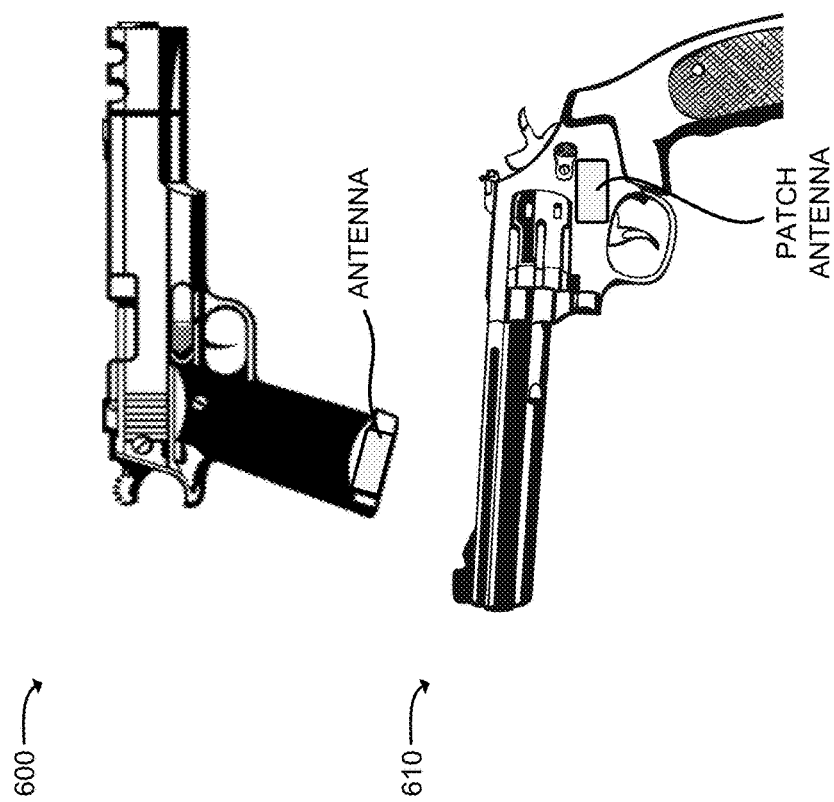
FIG. 6 is a diagram of example firearms on which antennas are installed that may be associated with a ballistics system.

FIG. 6 is a diagram of example firearms 600 and 610 on which antennas may be installed that are associated with a ballistics device. For example, firearms 600 and/or 610 may each include a respective antenna that is attached thereto and/or connected to a ballistics device of a respective round loaded in each of firearms 600 and/or 610. The antenna installed on firearms 600 and/or 610 may be larger and/or provide higher gain than a respective antenna installed on rounds loaded within firearms 600 and/or 610. The higher gain may enable a signal with higher signal strength and/or signal-to-noise ratio to be provided to a ballistics device than that provided by a round-based antenna. The higher signal strength and/or signal-to-noise ratio may increase the quantity of detectable signals and/or network information to be obtained, processed and/or stored in by the ballistics device.

Additionally, or alternatively, the larger size and/or unobstructed location of the antenna on firearms 600 and/or 610 may provide better flexibility with respect to broadening the frequency band, and/or tuning antenna pattern and/or directivity over which the antenna can operate. The broader frequency band and/or tuned antenna pattern/directivity may also, or alternatively, increase the quantity of detectable signals and/or network information to be obtained, processed and/or stored by the ballistics device.

Firearm 600 may include an antenna that is attached to, integrated with, and/or embedded within a magazine associated with the firearm, or the firearm itself. The antenna may be larger and provide greater gain than the antenna associated with the round. The antenna may be electrically connected to the round stored within the magazine and/or the firearm. The antennas, associated with firearm 600 and/or 610 may be connected to a conductor (not shown in FIG. 6) that allows signals from the antenna to a ballistics system associated with a round that is loaded into a magazine or firing chamber of firearm 600 and/or 610.

A method performed by ballistics device 220 and/or 510 associated with a round loaded in a firearm may include receiving by the ballistics device (via antenna 230 and/or 550, respectively), one or more electrical signals, during a time period, from one or more network devices; and obtaining, by the ballistics device (e.g., processing unit 320) and from the one or more electrical signals, network information associated with the one or more network devices during the time period. The network information may identify a first network address associated with a first time and a second network address associated with a second time. The ballistics device may process the network information to encode the network information; store (e.g., in memory 330) the encoded and/or encrypted network information; and receive, from an external computational and/or communication device after the round is discharged by the firearm, a request for the network information. In one non-limiting example, the request for the network information may be transmitted by a user (e.g., law enforcement officer, etc.) using an external device such as a device to scan a RFID tag associated with the ballistics device of the discharged round, a computer device (e.g., a laptop computer, tablet computer, smart phone, etc.), a server device, etc. via wired or wireless connection to the ballistics device of the discharged round. The ballistics system may output, to the external device, the encoded network information to enable the external device to process the encoded network information to decode and/or recover the network information. Alternatively, the ballistics device may process the encoded network information (e.g., using a copy of a key used to encode the network information) to decode the encoded network information. The external device may obtain, from the network information, the one or more network addresses and one or more times associated with the network addresses. The external device may identify network devices (e.g., base stations, eNodeBs Wi-Fi hot spots, etc.) associated with the network address. The external device may identify one or more locations associated with the identified network devices and may determine one or more proximate locations of the round, as a function of time, based on the identified locations of the network devices. For a ballistics device associated with (e.g., attached to, integrated within, or embedded within) a discharged bullet portion of the expended round that has been located or recovered by a user (e.g., a law enforcement officer, etc.), the external device may output location information that identifies the one or more proximate locations of the round at the one or more times prior to the discharge of the bullet. For a ballistics device associated with (e.g., attached to, integrated within, or embedded within) a casing portion of the expended round, the external device may be used to obtain location information prior to the discharge of the round as well as after the discharge of the round.

The round location information may be used by investigators to help solve a crime. For example, the round location information may be used to track a location of the round and, possibly the firearm (when the round is loaded within the firearm), and/or the perpetrator (when the perpetrator is carrying the firearm and/or the round) prior to and/or at the time that firearm is discharged.

Additionally, or alternatively, the ballistics device may be attached to, integrated within, or embedded within the casing portion of the round (in addition to or instead of the bullet portion of the round) that would enable round location information to be collected before and/or after the firearm is discharged. For example, in the case that the firearm does not eject the casing (e.g., such is the case when the firearm is a revolver, etc.) or if the casings are collected by the perpetrator after discharging the firearm, round location information may continue to be collected, which may provide investigators pre- and post-discharge information as to where the casing is located as a function of time (e.g., based on the network address, date, and/or time that is stored within the memory), which may enable the firearm and/or casing to be recovered and/or the perpetrator apprehended.

The foregoing description provides illustration and description, but is not intended to be exhaustive or to limit the implementations to the precise form disclosed. Modifications and variations are possible in light of the above teachings or may be acquired from practice of the embodiments.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Further, certain portions, described above, may be implemented as a component or logic that performs one or more functions. A component or logic, as used herein, may include hardware, such as a processor, an ASIC, or a FPGA, or a combination of hardware and software (e.g., a processor executing software).

It should be emphasized that the terms comprises and comprising, when used in this specification, are taken to specify the presence of stated features, integers, steps or components but do not preclude the presence or addition of one or more other features, integers, steps, components or groups thereof.

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the implementations unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A ballistics system, associated with a round of ammunition, that enables a location of the round of ammunition to be provided as a function of time, the ballistics system comprising:
    an antenna to:
        receive a radio frequency (RF) signal from a network at a first time, and
        output an electrical signal based on the received RF signal; and
    a processing unit to execute one or more instructions to:
        receive the electrical signal from the antenna, and
        process a packet associated with the electrical signal to obtain network information that identifies a network address of a network device, associated with the network, and the first time that the electrical signal was received; and
    a memory to store the network information to enable retrieval, from the memory, after the round of ammunition is discharged from a firearm, the retrieval of the network information enabling
        the network device to be identified based on the network address, and
        a proximate location of the round of ammunition at the first time to be provided based on the location of the identified network device.

2. The ballistics system of claim 1, where the antenna is associated with a bullet portion or a casing portion of the round of ammunition.

3. The ballistics system of claim 2, where the antenna is attached to, connected to or embedded within a base of the bullet portion.

4. The ballistics system of claim 2, where the antenna is attached to, connected to or embedded within a nose portion of the bullet portion.

5. The ballistics system of claim 2, where the antenna is attached to, connected to or embedded within a base of the casing portion.

6. The ballistics system of claim 2, where the antenna is attached to, connected to or embedded within an exterior surface of a cylindrical wall of the casing portion.

7. The ballistics system of claim 1, where the processing unit is attached to, connected to, or embedded within a base of the bullet portion.

8. The ballistics system of claim 1, further comprising:
a battery to provide power to the ballistics device.

9. The ballistics system of claim 8, where the battery is associated with a casing portion of the round of ammunition.

10. The ballistics system of claim 8, further comprising:
at least one conductor to connect the battery to the ballistics device.

11. A ballistics systems, associated with a round of ammunition, for providing the location of the round of ammunition as a function of time, the ballistics system comprising:
a first antenna, associated with a bullet portion of the round of ammunition, to receive radio frequency (RF) signals;
a first processing unit, associated with a base of the bullet portion of the round of ammunition, to execute one or more first instructions to:
receive, during a time period, electrical signals, from the first antenna, that are based on the received RF signals,
obtain, from packets associated with each of the electrical signals, network information that identifies network addresses associated with a plurality of network devices in proximity of the round of ammunition during the time period,
a first memory, associated with the bullet portion of the round of ammunition, to store the network information and information that identifies the times when the electrical signals were received by the first processing unit and to provide the location of the round of ammunition as a function of time;
a battery, associated with a casing portion of the round of ammunition, to provide electrical power to the first processing unit or the first memory.

12. The ballistics system of claim 11, further comprising:
at least one conductor, associated with the casing portion of the round of ammunition, that is connected to the batter and the first processing unit via which the electrical power is transported from the battery to the first processing unit.

13. The ballistics system of claim 11, further comprising:
a second antenna, associated with the casing portion of the round of ammunition, to receive different RF signals.

14. The ballistics system of claim 11, further comprising:
a second processing unit, associated with the casing portion of the round of ammunition, to execute one or more second instructions to:
receive different electrical signals, from a second antenna,
obtain, from the different electrical signals, different network information that identifies different network addresses associated with network devices in proximity of the round of ammunition during or after the time period.

15. The ballistics system of claim 14, further comprising:
at least one conductor, associated with the casing portion of the round of ammunition, that is connected to the battery and the second processing unit via which electrical power is transported to the second processing unit.

16. The ballistics system of claim 11, further comprising:
a second memory associated with the casing portion of the round of ammunition.

17. A method, performed by a ballistics device attached to or embedded within a round of ammunition, for collecting network information that enables location of the round of ammunition to be provided as a function of time, the method comprising:
receiving, by the ballistics device, radio frequency (RF) signals from one or more network devices during a time period;
obtaining, by the ballistics device and from packets associated with the RF signals, network information, the network information identifying a first network address associated with a first time during the time period and a second network address associated with a second time during the time period; and
storing the network information in a memory, associated with the ballistics device, to enable a computer device to
obtain the network information from the memory after the round of ammunition is expended from a firearm,
provide a proximate location, of the round of ammunition, based on a location of a network device associated with the first network address or the second network address, and
provide a time when the round of ammunition was at the proximate location based on the first time or the second time.

18. The method of claim 17 further comprising:
receiving, from the computer device and after the round of ammunition is discharged by the firearm, a request for the network information;
retrieving, from the memory, the network information based on the request for the network information;
outputting, to the computer device and in response to the request, the retrieved network information to enable the computer device to
identify a first network device, associated with the first network address and a second network device, associated with the second network address,
determine a first location of the first network device and a second location of the second device, and
determine a first proximate location of the round of ammunition at the first time based on the first location and a second proximate location of the round of ammunition at the second time based on the second location at the second time.

19. The method of claim 17 where storing the network information further comprises:
creating a data structure that includes at least a first field and a second field,
the first field enabling information, that identifies network addresses, to be stored, and
the second field enabling information, that identifies corresponding times when the network addresses were received by the ballistics device, to be stored; and
storing in the first field a first portion of the network information that identifies the first network address and the second network address; and
storing in the second field a second portion of the network information that identifies the first time and the second time.

20. The method of claim 17, where obtaining the network information, further comprises:

processing, by the ballistics device, the network information to encode the network information; and storing in the memory, the encoded network information.

21. The method of claim 20, where retrieving the network information, further comprises:

processing, by the ballistics device, the encoded network information to decode the encoded network information; and outputting the decoded network information.

* * * * *